Patented Nov. 3, 1931

1,830,618

UNITED STATES PATENT OFFICE

RICHARD PASTERNACK, OF BROOKLYN, AND GORDON O. CRAGWALL, OF QUEENS VILLAGE, NEW YORK, ASSIGNORS TO CHARLES PFIZER & COMPANY, OF BROOKLYN, NEW YORK, A CORPORATION OF NEW JERSEY

PRODUCTION OF LACTONES

No Drawing. Application filed April 12, 1930. Serial No. 443,912.

This invention relates to the production of lactones and more particularly to the production of gluconic γ-lactone from gluconic acid.

An aqueous solution of gluconic acid, readily obtainable in pure form by decomposition of an aqueous solution of barium gluconate with sulphuric acid, or, as a crude liquor, directly by fermenting sugar, gradually changes on standing, or more rapidly on heating, to a mixture of free gluconic acid, gluconic γ-lactone, and gluconic δ-lactone. A definite equilibrium is established for the three components depending upon the concentration of the solution. Gluconic γ-lactone cannot be obtained from this solution by simple evaporation.

According to the present invention, conversion of gluconic acid into γ-lactone can be obtained by heating a mixture of an aqueous solution of gluconic acid and a volatile dehydrating agent and distilling such solution to remove water with the dehydrating agent to separate gluconic γ-lactone crystals.

It is preferred to carry out this conversion by adding the dehydrating agent either to an aqueous solution of gluconic acid or a mixture of gluconic acid its δ- and γ-lactones, boiling the resulting mixture until a substantially clear solution results, filtering off any insoluble polymers that may be formed, distilling the solution, preferably under reduced pressure, until the water and a substantial proportion of the dehydrating agent is removed, thereby initiating the separation of gluconic γ-lactone crystals. Upon standing at room temperature more gluconic γ-lactone will crystallize out of the mother liquor. These crystals are then filtered out of the mother liquor, washed with alcohol, and dried. By adding to the mother liquor a fresh portion of an aqueous solution of the gluconic acid or gluconic acid-gluconic lactone mixture equivalent to the quantity of γ-lactone crystallized out and repeating the process, a further crop of γ-lactone crystals can be recovered equivalent to the amount of gluconic acid and lactones contained in the fresh solution added. This process can be repeated indefinitely without accumulating gluconic acid, dehydrating agent, or any other reactant in the mother liquor and a quantitative conversion of the gluconic acid solution to γ-lactone can be effected.

As dehydrating agents, any alcohol or other volatile agent that will not decompose the gluconic acid or gluconic lactones and will dehydrate same on simple distillation may be employed. Such alcohols as propyl, isopropyl, butyl, iso-butyl, amyl, and iso-amyl alcohols are suitable. Such alcohols as ethyl alcohol, not suitable in themselves, may be used with a complementary agent. For example, ethyl alcohol mixed with benzol or carbon tetrachloride forms a satisfactory dehydrating agent for this purpose.

Upon heating the aqueous gluconic acid solution with the alcohol, a solution of γ-lactone and an alkyl ester, depending upon the alcohol used, is formed. An equilibrium between these two compounds is established, depending on the temperature of the mixture and its water content, and as additions of fresh aqueous gluconic acid solution after separation of the γ-lactone, will reestablish this ester-lactone equilibrium, no accumulation of the ester takes place on consecutive runs and, consequently, the process can be repeated indefinitely with complete conversion of the gluconic acid solution to γ-lactone with the exception of that small quantity used to form the alkyl ester on the first run.

The source of gluconic acid solution for use in this process is immaterial providing it does not contain impurities that will obviously be detrimental to the crystallization and recovery of the γ-lactone in pure form. It is also immaterial whether the gluconic acid solution is allowed to stand until the equilibrium mixture of gluconic acid, its δ- lactone and γ-lactone is formed or whether gluconic acid solution is used in the process as the boiling step will convert the gluconic acid solution to a mixture of gluconic acid and its lactones.

The following example is given as a specific illustration of the process:

*Example*

An aqueous solution of gluconic acid is obtained by any well known process, such as by the reaction of barium gluconate with sulphuric acid, and converted to an equilibrium mixture of gluconic acid and its lactones by allowing it to stand or heating it. An aqueous equilibrium mixture of 60–80% strength (determined by titration) is boiled up with about four times its weight of commercial normal butyl alcohol until a substantially clear solution results. The solution may be filtered at this point to remove any insoluble polymerization products of gluconic acid that may be formed or other insoluble impurities. The filtered butyl alcohol solution is then evaporated under reduced pressure until the water is removed from the reaction mixture. (At first a butyl alcohol-water mixture comes over.) Distillation is continued, anhydrous butyl alcohol now distilling over while, at the same time, gluconic γ-lactone begins to crystallize out. Distillation is discontinued after about 60% of the alcohol introduced has been distilled off. The remaining alcoholic liquor is then allowed to stand at a temperature of about 30° to complete crystallization and the γ-lactone thus crystallized out is separated from the mother liquor by centrifuging or filtration and washed with fresh butyl alcohol. The γ-lactone can then either be dried by evaporation of the butyl alcohol or the butyl alcohol can be washed out with a more volatile solvent such as ethylene dichloride, benzol, etc. and the γ-lactone then dried.

The remaining mother liquor is now charged with a new portion of the aqueous equilibrium mixture equivalent in gluconic acid and lactone content to the quantity of γ-lactone recovered and sufficient n-butyl alcohol to compensate for that removed by distillation, and the boiling, distillation and crystallization steps repeated, a second yield of γ-lactone crystals equivalent to the amount of gluconic acid added being obtained. The mother liquor from this second cycle of the process may be again used in a third cycle and so on indefinitely, without accumulation of butyl ester in the reaction mixture. The aqueous equilibrium mixture and butyl alcohol on boiling form a mixture of γ-lactone and butyl ester which reaches an established equilibrium, and where mother liquor already containing butyl ester is used and the amount of fresh solution added is only equivalent to the γ-lactone removed, this equilibrium will be reached on repeating the cycle of the process with practically no conversion of the fresh gluconic acid solution into butyl ester and practically a 100% conversion of gluconic acid to γ-lactone is obtained.

The above process is extremely economical due to the practically quantitative conversion of the gluconic acid solution to γ-lactone.

It has been found that the best recovery of gluconic γ-lactone is made by distilling off the water and dehydrating agent in a sufficiently low vacuum, so that the distillation takes place at room temperature or slightly above, particularly after most of the water has been removed, as high temperatures favor formation of the ester. It is preferable, although not necessary, to use at least two parts by weight of alcohol to one part by weight of the gluconic acid solution. As the dehydrating agent distilled off can be recovered by fractionation and used again, the amount used is a negligible factor in the cost of production of γ-lactone by this process.

The invention claimed is:

1. Process for the production of gluconic γ-lactone comprising heating a mixture of an aqueous solution of gluconic acid and a volatile dehydrating agent, and distilling same to remove water with said agent to separate gluconic γ-lactone crystals.

2. Process for the production of gluconic γ-lactone comprising heating a mixture of an aqueous solution of gluconic acid and a volatile dehydrating agent until a substantially clear solution results, and distilling such solution under subatmosphere pressure to remove water with said agent to separate gluconic γ-lactone crystals.

3. Process for the production of gluconic γ-lactone comprising heating a mixture of an aqueous solution of gluconic acid and an aliphatic alcohol containing more than two carbon atoms, and distilling same to remove water with said alcohol to separate gluconic γ-lactone crystals.

4. Process for the production of gluconic γ-lactone comprising heating a mixture of an aqueous solution of gluconic acid and an aliphatic alcohol containing more than two carbon atoms until a substantially clear solution results, and distilling said solution to remove water with said alcohol to separate gluconic γ-lactone crystals.

5. Process for the production of gluconic γ-lactone comprising heating a mixture of an aqueous solution of gluconic acid and n-butyl alcohol until a substantially clear solution results, and distilling said solution under subatmosphere pressure to remove water and part of the alcohol to separate gluconic γ-lactone crystals.

6. Process for the production of gluconic γ-lactone comprising converting an aqueous solution of gluconic acid to a mixture of gluconic acid, gluconic δ-lactone, and gluconic γ-lactone in equilibrium, adding more than two parts by weight thereof of butyl alcohol, boiling said mixture until a substantially clear solution results and distilling said solution at a low temperature under subatmosphere pressure to remove water and part of the butyl alcohol to separate gluconic γ-lactone crystals.

7. Process for the production of gluconic γ-lactone comprising converting an aqueous solution of gluconic acid to a mixture of gluconic acid, gluconic δ-lactone, and gluconic γ-lactone in equilibrium, adding more than two parts by weight thereof of butyl alcohol, boiling said mixture until a substantially clear solution results, distilling said solution at a low temperature under subatmosphere pressure to remove water and part of the butyl alcohol thereby initiating separation of gluconic γ-lactone crystals, allowing the liquor to stand to complete separation of said crystals, removing said crystals from the mother liquor, adding to said mother liquor a fresh portion of the aqueous gluconic acid-gluconic lactone mixture equivalent in combined gluconic acid and lactone content to the γ-lactone recovered and an amount of butyl alcohol equal to that removed by distillation, and repeating said boiling, distilling and crystallizing steps.

8. Process for the production of gluconic γ-lactone from an equeous mixture of gluconic acid, gluconic δ-lactone, and gluconic γ-lactone in equilibrium, comprising adding to 1 part of said aqueous gluconic acid-gluconic lactone mixture of 60–80% strength about 4 parts by weight of n-butyl alcohol, boiling said mixture until a substantially clear solution results, distilling the solution under subatmosphere pressure at room temperature to remove water and approximately 60% of the butyl alcohol thereby initiating separation of gluconic γ-lactone crystals, allowing the liquor to stand to complete the separation of γ-lactone crystals, removing said crystals from the mother liquor, adding to the mother liquor a fresh portion of said aqueous gluconic acid-gluconic lactone mixture equivalent in combined gluconic acid and gluconic lactone content to the γ-lactone recovered and an amount of n-butyl alcohol substantially equal to that removed by distillation, and repeating said boiling, distilling, and crystallizing steps.

9. In a process for the production of gluconic γ-lactone, the steps comprising adding to a solution of butyl gluconate in butyl alcohol an equeous mixture of gluconic acid, gluconic δ-lactone, and gluconic γ-lactone, boiling said mixture until a substantially clear solution results, distilling said solution at a low temperature under subatmosphere pressure to remove water and a substantial portion of the butyl alcohol thereby initiating the separation of gluconic γ-lactone crystals, allowing the remaining liquor to stand to complete separation of said crystals, and removing said crystals.

Signed at Brooklyn in the county of Kings and State of New York, this 8th day of April, A. D. 1930.

RICHARD PASTERNACK.
GORDON O. CRAGWALL.